United States Patent [19]
Maciula

[11] 3,784,009
[45] Jan. 8, 1974

[54] HYDROCLONE FOR SEPARATING AN IMMISCIBLE HEAVY PHASE FROM A LIGHT PHASE LIQUID

[75] Inventor: L. Andrew Maciula, Stillwater, Okla.

[73] Assignee: Oklahoma State University, Stillwater, Okla.

[22] Filed: Dec. 13, 1971

[21] Appl. No.: 207,047

[52] U.S. Cl.................. 210/114, 210/304, 210/512
[51] Int. Cl............................................. B04c 5/04
[58] Field of Search..................... 210/84, 512, 114, 210/115, 304; 55/191, 459, 46; 209/211

[56] References Cited
UNITED STATES PATENTS

| | | | |
|---|---|---|---|
| 2,811,219 | 10/1957 | Wenzl | 55/459 |
| 3,200,568 | 8/1965 | McNeil | 55/191 |
| 2,967,618 | 1/1961 | Vane | 210/84 |
| 3,499,531 | 6/1969 | Feasel | 210/114 |
| 3,163,508 | 2/1961 | Tuck et al. | 55/46 |
| 3,151,961 | 1/1961 | Blackmore et al. | 210/512 |
| 3,651,944 | 3/1972 | Shuttleworth | 210/304 |
| 3,481,118 | 12/1969 | Willis et al. | 209/211 |

Primary Examiner—Frank A. Spear, Jr.
Assistant Examiner—Benoit Castel
Attorney—James R. Head et al.

[57] ABSTRACT

A hydroclone for separating an immiscible heavy phase from a light phase liquid including an upright cylindrical chamber having a tangentially intersecting inlet, an axial light phase outlet at the upper end thereof, a heavy phase outlet in the lower end, an opened top cylindrical interface member within the cylindrical chamber having an exterior diameter providing an annulus area between the interface member and the wall of the cylindrical chamber forming a passageway whereby heavy liquid cast outwardly by centrifugal force of circular liquid flow in the cylindrical chamber flows downwardly to the lower portion of the cylindrical chamber, and means of controlling the discharge of liquid from the heavy phase outlet in response to the level of heavy phase liquid in the cylindrical chamber.

9 Claims, 5 Drawing Figures

PATENTED JAN 8 1974 3,784,009

INVENTOR.
L. ANDREW MACIULA
BY
Head & Johnson
ATTORNEYS

HYDROCLONE FOR SEPARATING AN IMMISCIBLE HEAVY PHASE FROM A LIGHT PHASE LIQUID

BACKGROUND, SUMMARY AND OBJECTS OF THE INVENTION

The use of hydroclones or liquid cyclonic devices is well known. The typical use of a hydroclone, however, is that of extracting solid contaminants from a liquid medium. A hydroclone functions by imposing high centrifugal forces by a flow vortex within a cylindrical or conical chamber. Typically, a cylindrical chamber is utilized having a conical chamber affixed to it which tapers downwardly towards a small diameter vortical opening. The solid particles are cast to the exterior of the circulating liquid flow by the intense centrifugal forces imposed on them and ultimately pass through the vortical opening and out of the conical chamber. The liquid, with the solid particles discharged therefrom, migrate against centrifugal force to the center of the chamber and pass upwardly through an axial upper opening, to flow out of the hydroclone. While such arrangement functions very effectively in many applications requiring the separation of solid contaminant particles from liquid, such typical hydroclone arrangements are not as effective in separataing an immiscible heavy phase liquid from a light phase. The primary reason is that the centrifugal forces encountered in a conical configured hydroclone creates high shear forces, particularly at the tip of the indexed vortex. The tip of the induced vortex usually occurs adjacent to the vortical opening in the lower end of the conical portion. These high shear forces tend to emulsify immiscible liquids and to thereby create a homogenic liquid, which is even more difficult to separate by centifugal forces than was the condition of the liquid prior to introduction into the hydroclone.

An additional problem encountered with known types of hydroclones used for liquid-liquid separation is that frequently variable proportions of the two lights to be separated are presented at different times. Most known types of hydroclone designs do not include means of automatically adjusting to variable proportions of the liquids being separated.

It is an object of this invention to provide improved hydroclone means for separating a heavier immiscible liquid from a lighter liquid.

Another object of this invention is to provide a hydroclone for separating a heavier immiscible liquid from a lighter liquid medium in an arrangement which reduces the creation of emulsions of liquid through the hydroclone.

Another object of this invention is to provide hydroclone for separating a heavier immiscible liquid from a lighter liquid medium including means of providing control to permit the automatic withdrawal of one liquid from the other, regardless of change in the proportion of the mixture composition.

These objects, as well as others, will be fulfilled in the following description and claims, taken in conjunction with the attached drawings.

DESCRIPTION OF VIEWS

DESCRIPTION OF THE INVENTION

Figure 1:
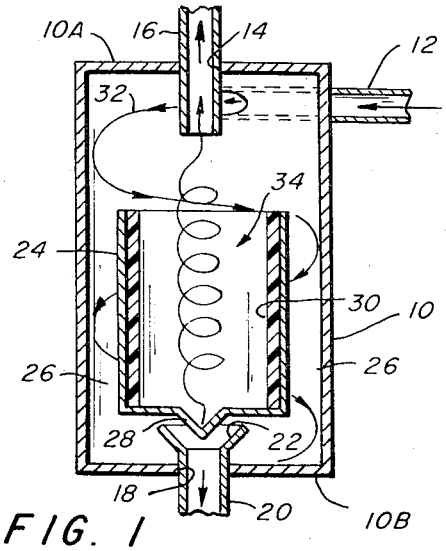
FIG. 1 is a cross-sectional view of an embodiment of the hydroclone of this invention for separating a heavier immiscible liquid from a lighter liquid, including means of controlling the rate of withdrawal of the heavier liquid from the hydroclone.

Referring to the drawings and first to FIG. 1, an embodiment of the invention is illustrated. The hydroclone includes an upright cylindrical chamber 10. Intersecting chamber 10 tangentially to the interior wall is a liquid inlet 12. In the closed top 10A of the chamber is a liquid outlet opening 14 in which is received an outlet conduit 16 extending coaxially downwardly within cylinder 10 to provide a vortex finder.

A heavy liquid outlet opening 18 is formed in cylindrical chamber bottom 10B. Positioned in heavy liquid outlet 18 is an outlet conduit 20 which is outwardly flanged at the top to provide a valve surface 22.

Positioned within the cylindrical chamber 10 is an open top cylindrical interface member 24. The outer diameter of interface member 24 is smaller than the inner diameter of cylindrical chamber 10 providing an annular area 26 therebetween. Formed on the closed lower end of interface member 24 is a valve element 28 configured so such that when in engagement with valve surface 22 opening 18 is closed to the flow of liquid but when the interface member 24 rises liquid may flow out through outlet conduit 20.

Interface member 24 includes a floatation material 30 to give the interface member a total specific gravity less than the heavier liquid component and lighter than the lighter liquid component. Thus the interface member 24 moves upwardly within cylinder chamber 10 when the level of the heavy liquid within chamber 10 reaches a preselected height and moves downwardly to seat against valve surface 22 when the level of the heavy liquid component reaches a preselected minimum level.

OPERATION OF THE INVENTION

The invention, as previously indicated, is directed to the specific problem of separating a heavy immiscible liquid entrained in a lighter liquid medium. While many examples may be cited of the requirement for such application typical illustrations are those of separating water from hydrocarbon fuel, such as gasoline or kerosine, or water from lubricating oil. It is understood that the invention is not limited to this usage which is cited only as examples of the application of the invention. The liquid to be separated, such as fuel having water entrained therein is introduced under pressure through inlet 12 to the interior of cylindrical chamber 10. Since the flow system is directed into the cylindrical chamber 10 tangentially with respect to the internal circumference thereof, the flow stream impinges against the inner periphery of the chamber 10 and moves therearound in a rapid continuous flow as long as the flow stream is being admitted under pressure through the inlet 12. Of course, the force of gravity acting on the incoming flow stream causes the flow stream to move downwardly within the chamber 10 during the rapid circuitous movement of the flow stream therein. As is well known, this creates a cyclonic action within the chamber 10 with the inherent qualities thereof, wherein a substantial vacuum is created within the center of the cyclone. Centrifugal force of the "storm" causes the heavier components of the flow stream, such as water, to be cast radially outwardly in the cyclone. Thus, a vortical flow, indicated by numeral 32, is created and the heavier components strike the inner periphery of the chamber 10 and accumulate in the annular chamber 26. Simultaneously the lighter components of the flow stream, such as fuel, remain in the center of the cyclone and accumulate in the cylindrical interface 24. As is well known, the cyclonic forces result in an updraft at the center of the "storm" which in this case will be in the center of the cylinder 10 and interface 24 and results in an induced vortical flow, as indicated by the numeral 34 in the interface 24. The lighter components of the flow stream, which have accumulated in the interface 24, are "caught up" in the natural central up-draft currents created by the cyclonic action and rise toward the vortex finder 16 when they are discharged from the chamber 10 therethrough. Since the bottom of the interface 24 is closed, the lighter components of the flow stream can escape only through the discharge passage 16.

In order to effectively complete the separation of the heavier from the lighter liquid components achieved by the hydroclone, the extracted heavier liquid component must be withdrawn at a rate equal to the rate of extraction. If heavy liquid is withdrawn too rapidly, a portion of the lighter liquid will also be withdrawn. On the other hand, if heavy liquid is not withdrawn rapidly enough, a portion will become remixed with the lighter component and pass outwardly with the lighter liquid through vortex finder 16. This invention provides a means of automatically regulating the rate of discharge of the heavier liquid component.

The interface member 24, provided with floatation 30 to obtain a specific gravity such that as the proportion of heavier liquid component increases the interface member 24 is displaced upwardly, opening valve 22. Heavier liquid component is then withdrawn through outlet conduit 20 until the level of heavy duty within cylindrical chamber 10 reduces to the point wherein the interface member 24 contacts valve surface 22 to close it.

Thus, the arrangement of FIG. 1 provides means of separating the heavy liquid extracted by the forced vortex 32 from being subjected to the deleterious effect of the induced vortex 34, which otherwise would tend to emulsify the liquids. The interface member 24 serves to effectively and mechanically separate the forced from the induced vortex and to maintain the extracted heavier liquid component towards the wall of chamber 10 and the lighter liquid component within the interior of interface member 24.

ALTERNATE EMBODIMENTS

Figure 3:
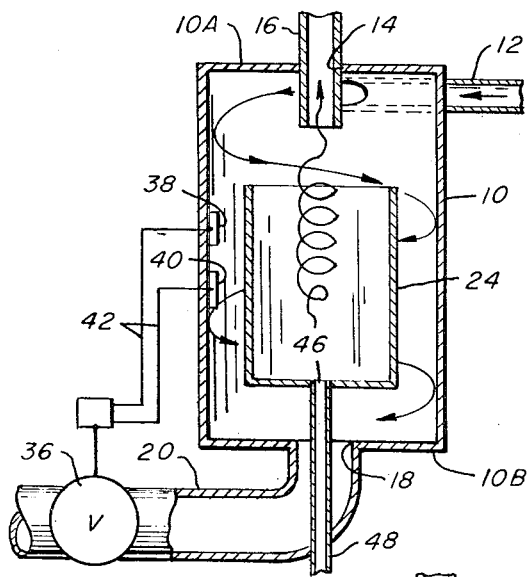
FIG. 3 is a cross-sectional view of an alternate embodiment showing an alternate means of controlling the withdrawal of the heavier liquid component extracted in the hydroclone.

FIG. 3 shows an alternate arrangement for controlling the height of the extracted heavy liquid component within chamber 10. In this arrangement the outlet conduit 20 is provided with a controllable valve 36. Positioned within chamber 10 is an upper interface detector 38 and a lower interface detector 40, both of which are connected by conductors 42 to valve 36. When the level of heavy liquid component reaches upper interface detector 38 valve 36 is opened, permitting discharge of heavier liquid. When the interface falls to the level detected by lower interface detector 40 valve 36 is closed. In this manner the height of the interface between the heavier liquid component and the lighter liquid component is controlled within selected limits.

FIG. 3 includes another alternate arrangement. Interface member 24 has a discharge opening 46 in the lower end thereof which connects to a conduit 48 extending exterior of chamber 10. Light liquid component may be withdrawn either through discharge conduit 48 or vortex finder 16, or both.

Figure 4:
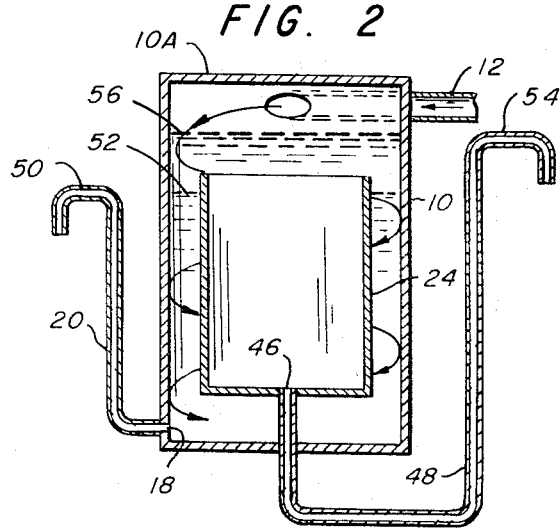
FIG. 4 is an additional alternate embodiment of means of controlling the extraction of heavier and lighter liquid components separated in the hydroclone. The extraction is accomplished at automatically controlled rates in proportion to the rate of separation of the two liquid components.

FIG. 4 shows another arrangement for controlling the level of the two liquid components. In this arrangement discharge conduit 20 is formed in a nature of a siphon 50, which functions to siphon off heavy liquid component when the level thereof reaches that indicated by the numeral 52. In the same manner, conduit 48 connected to the opening 46 in interface member 24 connects to a siphon arrangement 54 which siphons off the lighter liquid component when the level thereof reaches a height indicated by numeral 56. Thus, the arrangement of FIG. 4 maintains a balanced differential of the dispersing heads of the two liquids. Once siphon means 50 and 54 are primed the system automatically disperses the two liquid phases at the rates at which they are delivered to the hydroclone for separation.

Figure 2:
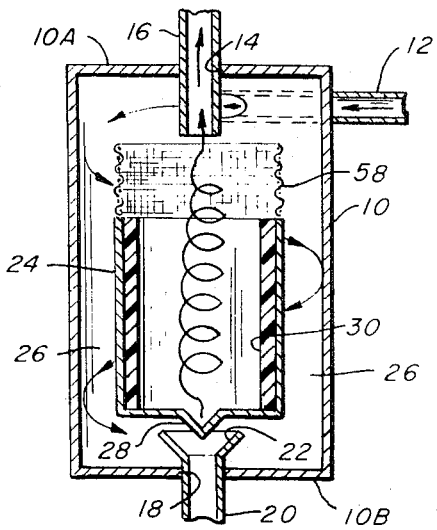
FIG. 2 is an alternate embodiment of the arrangement of FIG. 1 including coalescing means to improve the effectiveness to extract heavier immiscible components from a lighter liquid medium, particularly where the heavier liquid component is in the form of small suspended droplets.

FIG. 2 illustrates an arrangement embodying essentially the same arrangement as illustrated and described with reference to FIG. 1 but including the addition of a coalescing portion 58 as an upper extension of the interface member 24. The coalescer 58 is formed of a media preferentially wetted by the heavier liquid component. This causes droplets of the heavier liquid component to coalesce or grow in size as liquid passes through the media. As the sizes of the droplets of the heavier liquid component grow larger they are eventually removed by drag from the exterior of the coalescing media and travel downwardly through the annular passageway 26 to the lower portion of chamber 10 to be withdrawn through outlet conduit 20.

Figure 5:
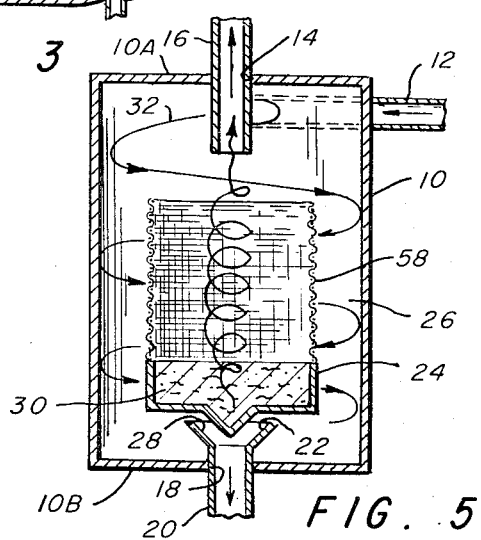
FIG. 5 is an alternate arrangement of the embodiment of FIG. 2 showing means of increased use of a coalescing medium in the hydroclone for improving the effectiveness of separating heavier from lighter liquid components.

FIG. 5 shows an arrangement similar to FIG. 2 but showing substantially the entire cylindrical surface of the interface member 24 being formed of a coalescing media 58. As liquid is injected into the interior of chamber 10 the forced vortex causes the heavier liquid component to migrate to the wall of chamber 10 and the lighter liquid component migrates against the centrifugal force to the interior. This forced vortex continues in the annular passageway 26 to some extent, the amount depending upon the parameters of the design of the hydroclone. Lighter liquid component from annular area 26 migrates toward the interior and passes through the coalescing media 58. In doing so any entrained droplets of heavier component tends to adhere to the coalescing media and gather into larger droplets which remain on the exterior of the coalescing material 58 and pass downwardly for discharge through conduit 20. Thus, in the arrangement of FIG. 5, the cylindrical walls of the interface member 24 serve to function of first, isolating the heavier liquid component forced to the outside and the lighter liquid component forced to the inside, and second, to augment the separation of heavier liquid component as the lighter liquid component migrates towards the interior of the chamber for discharge through vortex finder 16.

The illustrated embodiments fulfill the objects established for the invention. The illustrated arrangements are diagrammatic and not intended to pictorially represent commerical embodiments of the invention. Many details of construction and arrangements of components may be made all in keeping with the disclosure. It is understood that the invention is not limited to the embodiments set forth herein for purpose of exemplification, but is to be limited only by the scope of the attached claim or claims, including the full range of equivalency to which each element thereof is entitled.

What is claimed:

1. A hydroclone for separating immiscible heavy components from light components of a flow stream and comprising an upright cylindrical chamber having an inlet tangentially intersecting the cylindrical wall adjacent the upper end thereof for directing the flow stream into the cylindrical chamber wherein a cyclonic action is produced therein, an axial light component outlet provided in the upper end of said cylindrical chamber, a heavy component outlet provided in the lower end of said cylindrical chamber, an open topped cylindrical interface member freely movably disposed within said cylindrical chamber and having an exterior diameter less than interior diameter of said cylindrical chamber providing an annual area therebetween, said heavy components being cast outwardly against the cylindrical wall of said cylindrical chamber by the cyclonic action and passing downwardly through said annular area to the lower portion of said cylindrical chamber for discharge out said heavy components outlet, and means for controlling the discharge of fluid through said heavy components outlet in response to the lever of the heavy components in said cylindrical chamber.

2. A hydroclone for separating immiscible heavy components from light components of a flow stream according to claim 1 wherein said interface member is vertically movable within said cylindrical chamber, wherein said interface member floats in said heavy components, and said discharge means comprises valve means cooperating between said interface member and said cylindrical chamber heavy components outlet wherein said valve means opens when the heavy components level rises to a preselected level and closes when the heavy components level falls to a preselected lower level.

3. A hydroclone for separating immiscible heavy components from light components of a flow stream according to claim 2 wherein said valve means includes a valve seat means formed about said cylindrical chamber heavy components outlet, and a valve closing element affixed to said interface member sealably engagable with said valve seat element configured to engage with and seal said heavy components outlet when the heavy components in said cylindrical chambers falls to said preselected lower level.

4. A hydroclone for separating immiscible heavy components from light components of a flow stream according to claim 1 wherein said means of controlling the discharge of fluid through said heavy components outlet includes a flow control valve in series with said cylindrical chamber heavy components outlet, interface detecting means within said cylindrical chamber including means of detecting the height of the interface between the heavy components and the light components in said cylindrical chamber, said interface detecting means being connected to said control valve and operable to open said valve when the height of the interface reaches a preselected level and to close said valve when the height of the interface falls to a lower preselected level.

5. A hydroclone for separating immiscible heavy components from light components of a flow stream according to claim 1 wherein said cylindrical interface member has an opening in the bottom thereof, and including a conduit connected to said interface member opening and extending exteriorly of said cylindrical chamber providing a second light component outlet.

6. A hydroclone for separating immiscible heavy components from light components of a flow stream according to claim 1 wherein said means of controlling the discharge of fluid through said heavy components outlet in response to the level of the heavy components in said clyindrical chamber includes a siphon connected to said cylindrical chamber heavy components outlet, said siphon being configured to automatically withdraw liquid when the height of said heavy components within said cylindrical chamber reaches a preselected level and to terminate withdrawal when the height of said heavy components falls to a preselected minimum level.

7. A hydroclone for separating immiscible heavy components from light components of a flow stream according to claim 6 wherein said axial light components outlet in the upper end of said cylindrical chamber is closed, wherein said interface member has an opening in the lower portion thereof, and including a siphon connected to said opening in the lower end of said interface member, said siphon being configured to automatically withdraw liquid when the height of said light components within said cylindrical chamber reaches a preselected level and to terminate withdrawal when the height of said light components falls to a preselected minimum level.

8. A hydroclone for separating immiscible heavy components from light components of a flow stream according to claim 1 wherein at least a portion of the cylindrical wall of the interface member is formed of coalescing material wetted by said heavy components.

9. A hydroclone for separating immiscible heavy components from light components of a flow stream according to claim 8 wherein the upper portion of the cylindrical wall of said interface member is formed of said coalescing material.

* * * * *